US010293546B2

(12) United States Patent
Hermann et al.

(10) Patent No.: US 10,293,546 B2
(45) Date of Patent: May 21, 2019

(54) POWDER APPLICATION APPARATUS AND METHOD OF OPERATING A POWDER APPLICATION APPARATUS

(71) Applicant: SLM Solutions Group AG, Lübeck (DE)

(72) Inventors: André Hermann, Lübeck (DE); Andreas Wiesner, Lübeck (DE); Dieter Schwarze, Lübeck (DE)

(73) Assignee: SLM SOLUTIONS GROUP AG (DE)

( * ) Notice: Subject to any disclaimer, the term of this patent is extended or adjusted under 35 U.S.C. 154(b) by 0 days.

(21) Appl. No.: 16/015,313

(22) Filed: Jun. 22, 2018

(65) Prior Publication Data

US 2018/0297276 A1    Oct. 18, 2018

Related U.S. Application Data

(62) Division of application No. 14/312,245, filed on Jun. 23, 2014, now Pat. No. 10,046,520.

(30) Foreign Application Priority Data

Jun. 25, 2013 (EP) ..................... 13173625

(51) Int. Cl.
*B28B 13/00* (2006.01)
*B29C 64/153* (2017.01)
(Continued)

(52) U.S. Cl.
CPC .......... *B29C 64/153* (2017.08); *B22F 3/1055* (2013.01); *B29C 64/165* (2017.08);
(Continued)

(58) Field of Classification Search
CPC .................. B22F 3/105; B22F 3/1055; B22F 2003/1056; B65D 83/06; B29C 67/0081;
(Continued)

(56) References Cited

U.S. PATENT DOCUMENTS 5,429,676 A    7/1995 Uchida et al.
5,554,393 A    9/1996 Uchida et al.
(Continued)

FOREIGN PATENT DOCUMENTS

EP    2202016 A1    6/2010
GB    2482010 A     1/2012
(Continued)

*Primary Examiner* — Joseph S Del Sole
*Assistant Examiner* — Thu Khanh T Nguyen
(74) *Attorney, Agent, or Firm* — Tarolli, Sundheim, Covell & Tummino LLP (57) ABSTRACT

A powder application apparatus is provided for use in a device for manufacturing work pieces by exposing powder layers to electromagnetic radiation or particle radiation. The powder application apparatus comprises a first powder storage provided in a first part of the powder application apparatus and configured to receive and store raw material powder. The powder application apparatus further comprises a first powder supply channel provided in a second part of the powder application apparatus and configured to discharge raw material powder from the first powder storage onto a carrier located below the apparatus. A first channel opening/closing element is configured to be moved between a first position to allow the discharge of raw material powder from the first powder storage onto the carrier, and a second position in which the discharge of raw material powder from the first powder storage onto the carrier is presented.

18 Claims, 6 Drawing Sheets

(51) Int. Cl.
  *B22F 3/105*   (2006.01)
  *B65D 83/06*   (2006.01)
  *B29C 64/165*  (2017.01)
  *B29C 64/20*   (2017.01)

(52) U.S. Cl.
  CPC .............. *B29C 64/20* (2017.08); *B65D 83/06* (2013.01); *B22F 2003/1056* (2013.01); *Y02P 10/295* (2015.11)

(58) Field of Classification Search
  CPC ............. B29C 67/0085; B29C 67/0077; Y02P 10/295
  USPC ........ 425/63–65, 130, 132, 133.1, 134, 145, 425/147, 256–257, 260, 262, 421, 425/445–449, 451, 462
  See application file for complete search history.

(56) References Cited

U.S. PATENT DOCUMENTS

| | | |
|---|---|---|
| 6,698,624 B2 | 3/2004 | Ufheil et al. |
| 7,018,194 B2 | 3/2006 | Kitamura et al. |
| 8,696,341 B2 | 4/2014 | Staehle et al. |
| 2002/0090410 A1 | 7/2002 | Tochimoto et al. |

FOREIGN PATENT DOCUMENTS

| | | |
|---|---|---|
| WO | 9611117 | 4/1996 |
| WO | 0078485 A2 | 12/2000 |

POWDER APPLICATION APPARATUS AND METHOD OF OPERATING A POWDER APPLICATION APPARATUS

RELATED APPLICATIONS

The present invention is a divisional application of U.S. application Ser. No. 14/312,245 filed on 23 Jun. 2014, which claims priority from European Patent Application No. 13 173 625.8, filed 25 Jun. 2013, the entirety of both of which is incorporated herein by reference.

TECHNICAL FIELD

The present invention relates to a powder application apparatus for use in a device for manufacturing work pieces by exposing powder layers to electromagnetic radiation or particle radiation. Further, the present invention relates to a method of operating such a powder application apparatus.

BACKGROUND

It is known to manufacture complex three-dimensional work pieces by selectively exposing powder layers to electromagnetic radiation or particle radiation. In such manufacturing approaches, a raw material powder layer of a metallic or a ceramic material is deposited onto a carrier. Then, the raw material powder layer is selectively exposed to irradiation (e.g. to a laser beam). The positions of the powder areas selectively exposed to irradiation usually differ from raw material powder layer to raw material powder layer and depend on a target geometry of the three-dimensional work piece to be manufactured. Due to the irradiation, particles of raw material powder located within the irradiated areas melt or sinter, thereby transforming the parts of the raw material powder layer located within the irradiated areas into corresponding solid material structures. After having generated the solid material structures, a further raw material powder layer is deposited onto the carrier (i.e. deposited onto the overall solid material structure generated so far), and is exposed to irradiation in corresponding selected areas, and so on.

Figure 1:
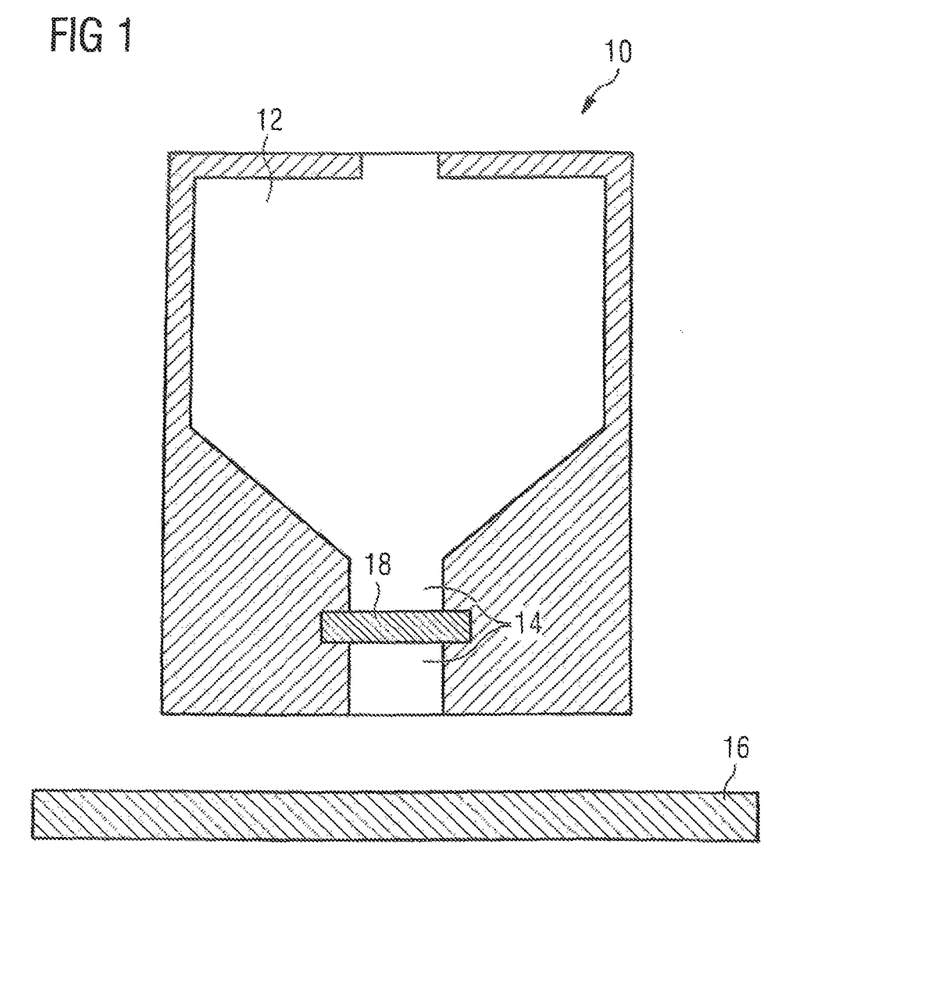
FIG. 1 shows a schematic cross-sectional illustration of a conventional powder application apparatus.

FIG. 1 schematically shows a conventional powder application apparatus 10. The powder application apparatus 10 comprises a powder storage 12 provided in a first part of the powder application apparatus and configured to receive and store raw material powder. Further, the powder application apparatus 10 comprises a powder supply channel 14 provided in a second part of the powder application apparatus 10 and configured to discharge raw material powder from the powder storage 12 onto a carrier 16 located below the powder application apparatus 10. A channel opening/closing mechanism 18 which is provided in the powder supply channel 14 comprises a moving element configured to be moved between a first position in which the moving element allows the discharge of raw material powder from the powder storage 12 onto the carrier 16, and a second position in which the moving element prevents the discharge of raw material powder from the powder storage 12 onto the carrier 16. The channel opening/closing mechanism 18 usually comprises electric motors which drive the moving element between the first and the second position.

SUMMARY

It is an object of the present invention to provide an alternative powder application apparatus which is suitable for use in a device for manufacturing work pieces by exposing powder layers to electromagnetic radiation or particle radiation. Further, it is an object of the present invention to provide a method of manufacturing work pieces by exposing powder layers to electromagnetic radiation or particle radiation using such an alternative powder application apparatus.

According to an aspect of the present invention, a powder application apparatus for use in a device for manufacturing work pieces by exposing powder layers to electromagnetic radiation or particle radiation is provided. The powder application apparatus comprises a first powder storage provided in a first part of the powder application apparatus and configured to receive and store raw material powder. The powder application apparatus further comprises a first powder supply channel provided in a second part of the powder application apparatus and configured to discharge raw material powder from the first powder storage onto a carrier located below the apparatus. Further, a first channel opening/closing element is provided in the first powder supply channel, the first channel opening/closing element being configured to be moved between a first position in which the first channel opening/closing element allows the discharge of raw material powder from the first powder storage onto the carrier, and a second position in which the first channel opening/closing element prevents the discharge of raw material powder from the first powder storage onto the carrier. The first channel opening/closing element is configured to be moved between the first and the second position by means of an external mechanical force acting on the first channel opening/closing element, the external mechanical force being caused by abutting the first channel opening/closing element against a stopper of the device for manufacturing work pieces when moving the powder application apparatus over the carrier.

The term "external mechanical force" in the context of the present application should designate a mechanical force which acts on the first channel opening/closing element of the powder application apparatus from "outside" of the powder application apparatus. Specifically, the external mechanical force is caused by the interaction of the first channel opening/closing element with the stopper of the device for manufacturing work pieces when the powder application apparatus is moved over the carrier. In particular, upon movement of the powder application apparatus over the carrier in one direction, the interaction of the first channel opening/closing element with the stopper may generate an external mechanical force which acts on the first channel opening/closing element so as to cause a movement of the first channel opening/closing element in an opposite direction.

An advantageous effect of such a powder application apparatus is that the first channel opening/closing mechanism has a simple structure, since it is wholly mechanically driven, i.e. no electric motors are needed as driving means. This significantly reduces the weight of the powder application apparatus which again makes it possible to increase the speed/acceleration characteristics of movements of the powder application apparatus. Also, there is no need to provide electrical connections which provide the powder application apparatus with electrical energy from outside in order to drive the electric motors. Further, there is no need to track the position of the powder application apparatus in order to discharge the raw material powder at the right position since it is automatically ensured that the raw material powder is discharged in the desired area (an area in front of a leveling slider the structure and function of which will be explained in more detail in the following).

According to an embodiment, in one of the first and the second position, the first channel opening/closing element projects from a side surface of a housing of the powder application apparatus. In the other one of the first and the second position, the first channel opening/closing element may not project from the side surface of the housing of the powder application apparatus, or may project less or further from the side surface of the housing of the powder application apparatus.

The first channel opening/closing element may, for example, be a plate member movable in a horizontal direction between the first and the second position, wherein, in one of the first and the second position, a side surface of the plate member may project from the side surface of the housing of the powder application apparatus, and wherein, in the other one of the first and the second position, the side surface of the plate member may be aligned with the side surface of the housing of the powder application apparatus, or may project less or further from the side surface of the housing of the powder application apparatus. For example, the first channel opening/closing element might be provided with an opening which is aligned with the first powder supply channel when the first channel opening/closing element is disposed in its first position such that raw material powder from the first powder storage can be discharged onto the carrier through the opening.

Alternatively, the first channel opening/closing element may comprise a pivotable blade which, in the second position of the first opening/closing element, is adapted to receive raw material powder discharged from the first powder storage, but to prevent the raw material powder from being applied onto the carrier. Further, the pivotable blade may be adapted to pivot around a pivot axis in order to discharge the raw material powder onto the carrier, when an external mechanical force acts on the first channel opening/closing element, the external mechanical force in particular being caused by abutting the first channel opening/closing element against a stopper of the device for manufacturing work pieces when moving the powder application apparatus over the carrier.

The powder application apparatus may further comprise a first spring element connected to the first channel opening/closing element and the powder application apparatus such that the spring element causes a force which automatically pushes the first channel opening/closing element from the first position into the second position as soon as the first channel opening/closing element no longer abuts against the stopper. The stopper then merely serves to push the first channel opening/closing element into its first position, whereas the spring serves to move the first channel opening/closing element into its second position. Further, the device for manufacturing work pieces may comprise two stoppers. A first stopper then may serve to interact with the first channel opening/closing element so as to move the first channel opening/closing element into its first position, whereas a second stopper may serve to interact with the first channel opening/closing element so as to move the first channel opening/closing element into its second position. For example, the two stoppers may be provided in the region of opposing side surfaces of the housing of the powder application apparatus.

The powder application apparatus may further comprise a second powder storage provided in a first part of the powder application apparatus and configured to receive and store raw material powder, a second powder supply channel provided in a second part of the powder application apparatus and configured to discharge raw material powder from the second powder storage onto the carrier located below the apparatus, and a second channel opening/closing element provided in the second powder supply channel and being configured to be moved between a first position in which the second channel opening/closing element allows the discharge of raw material powder from the second powder storage onto the carrier, and a second position in which the second channel opening/closing element prevents the discharge of raw material powder from the second powder storage onto the carrier. The second channel opening/closing element may be configured to be moved between the first and the second position by means of an external mechanical force acting on the second channel opening/closing element, the external mechanical force being caused by abutting the second channel opening/closing element against a stopper of the device for manufacturing work pieces when moving the powder application apparatus over the carrier.

A powder application apparatus which comprises two powder storages may be loaded with two different types of raw material powders. Further, as will be described in more detail below, power contained in the first powder storage may be applied onto the carrier when moving the powder application apparatus in a first direction, while power contained in the second powder storage may be applied onto the carrier when moving the powder application apparatus in a second direction opposite to the first direction. Further, a powder application apparatus which comprises a first and a second channel opening/closing element preferably is employed in a device for manufacturing work pieces which is equipped with two stoppers such that the first device channel opening/closing element may interact with a first stopper, while the second channel opening/closing element may interact with a second stopper in order to move the first and the second channel opening/closing element between the respective first and second positions.

The second channel opening/closing element may be configured as described above in connection with the first channel opening/closing element, i.e. in one of the first and the second position, the second channel opening/closing element may project from a side surface of a housing of the powder application apparatus. In the other one of the first and the second position, the second channel opening/closing element may not project from the side surface of the housing of the powder application apparatus, or may project less or further from the side surface of the housing of the powder application apparatus.

Like the first channel opening/closing element, also the second channel opening/closing element may, for example, be a plate member movable in a horizontal direction between the first and the second position, wherein, in one of the first and the second position, a side surface of the plate member may project from the side surface of the housing of the powder application apparatus, and wherein, in the other one of the first and the second position, the side surface of the plate member may be aligned with the side surface of the housing of the powder application apparatus, or may project less or further from the side surface of the housing of the powder application apparatus. For example, the second channel opening/closing element might be provided with an opening which is aligned with the second powder supply channel when the second channel opening/closing element is disposed in its first position such that raw material powder from the second powder storage can be discharged onto the carrier through the opening.

Alternatively, the second channel opening/closing element may comprise a pivotable blade which, in the second position of the second channel opening/closing element, is adapted to receive raw material powder discharged from the second powder storage, but to prevent the raw material powder from being applied onto the carrier. Further, the pivotable blade may be adapted to pivot around a pivot axis in order to discharge the raw material powder onto the carrier, when an external mechanical force acts on the second channel opening/closing element, the external mechanical force in particular being caused by abutting the second channel opening/closing element against a stopper of the device for manufacturing work pieces when moving the powder application apparatus over the carrier.

The powder application apparatus may further comprise a second spring element connected to the second channel opening/closing element and the powder application apparatus such that the spring element causes a force which automatically pushes the second channel opening/closing element from the first position into the second position as soon as the second channel opening/closing element no longer abuts against the stopper. The stopper then merely serves to push the second channel opening/closing element into its first position, whereas the spring serves to move the second channel opening/closing element into its second position.

Additionally or alternatively thereto, the first channel opening/closing element and the second channel opening/closing element, however, also may be formed integrally with each other, i.e. a single component may form the first and the second channel opening/closing element. For example, the first channel opening/closing element and the second channel opening/closing element may be formed by a plate member which may be movable in a horizontal direction. The plate member may be provided with two openings which may be brought into alignment with the first and the second powder supply channel, respectively such that raw material powder from the first and the second powder storage, respectively, can be discharged onto the carrier through the respective opening.

The first and the second channel opening/closing element may be configured such that both, the first and the second channel opening/closing element, can be simultaneously positioned in a filling position, in which they prevent the discharge of raw material powder from the first and the second powder storage onto the carrier. When the first and the second channel opening/closing element are disposed in their filling position, the first and the second powder storage can be filled with a desired amount of powder, while the discharge of said powder onto the carrier is prevented. When disposed in its filling position, the first channel opening/closing element may project from a first side surface of a housing of the powder application apparatus. Similarly, when disposed in its filling position, the second channel opening/closing element may project from a second side surface of a housing of the powder application apparatus which is disposed opposite from the first side surface of a housing of the powder application apparatus.

Further, the first and the second channel opening/closing element may be configured such that a combined movement of the first and the second channel opening/closing element from their filling position in a first moving direction causes the first channel opening/closing element to move into its first position, in which it allows the discharge of raw material powder from the first powder storage onto the carrier, and simultaneously causes the second channel opening/closing element to move into its second position, in which it prevents the discharge of raw material powder from the second powder storage onto the carrier.

When the first channel opening/closing element is disposed in its first position, the first channel opening/closing element may project further from the first side surface of the housing of the powder application apparatus than in its filling position. The second channel opening/closing element, when being disposed in its second position, however, may project less from the second side surface of the housing of the powder application apparatus than in its filling position or may even be aligned with the second side surface of the housing of the powder application apparatus. The combined movement of the first and the second channel opening/closing element may be achieved by a movement of the powder application apparatus in a second moving direction opposite to the first moving direction and the abutment of the second channel opening/closing element against a second stopper associated with the second channel opening/closing element.

Moreover, the first and the second channel opening/closing element may be configured such that a combined movement of the first and the second channel opening/closing element from the filling position in a second moving direction causes the first channel opening/closing element to move into its second position, in which it prevents the discharge of raw material powder from the first powder storage onto the carrier, and simultaneously causes the second channel opening/closing element to move into its first position, in which it allows the discharge of raw material powder from the second powder storage onto the carrier.

When the first channel opening/closing element is disposed in its second position, the first channel opening/closing element may project less from the first side surface of the housing of the powder application apparatus than in its filling position or may even be aligned with the first side surface of the housing of the powder application apparatus. The second channel opening/closing element, when being disposed in its first position, however, may project further from the second side surface of the housing of the powder application apparatus than in its filling position. The combined movement of the first and the second channel opening/closing element may be achieved by a movement of the powder application apparatus in a first moving direction opposite to the second moving direction and the abutment of the first channel opening/closing element against a first stopper associated with the first channel opening/closing element. Further, as will be described in more detail below, power contained in the first powder storage may be distributed onto the carrier when moving the powder application apparatus in a first direction, while power contained in the second powder storage may be distributed onto the carrier when moving the powder application apparatus in a second direction opposite to the first direction.

This configuration of the first and the second channel opening/closing element allows a particularly efficient operation of the powder application apparatus. In a first step, the first and the second channel opening/closing element may positioned in their respective filling positions. This may be achieved, for example, by a suitable movement of the powder application apparatus over the carrier and a corresponding interaction of the first or the second channel opening/closing element with the first or the second stopper. The first and the second powder storage then may be filled while the first and the second channel opening/closing element prevent the discharge of powder onto the carrier.

In a second step, the powder application apparatus may be moved over the carrier in a first moving direction until the first channel opening/closing element abuts against the first stopper. Thereby the first and the second channel opening/closing element are moved in a second moving direction opposite to the first moving direction until the first channel opening/closing reaches its second position, in which it still prevents the discharge of raw material powder from the first powder storage onto the carrier, whereas the second channel opening/closing element is positioned in its first position, in which it allows the discharge of raw material powder from the second powder storage onto the carrier.

Thereafter, the powder application apparatus may be moved over the carrier in the second moving direction until the second channel opening/closing element abuts against the second stopper. Thereby the first and the second channel opening/closing element are moved in the first moving direction opposite to the second moving direction until the first channel opening/closing reaches its first position, in which it allows the discharge of raw material powder from the first powder storage onto the carrier, whereas the second channel opening/closing element is positioned in its second position, in which it prevents the discharge of raw material powder from the second powder storage onto the carrier. In this way, each time the powder application apparatus moves over the carrier, a powder layer can be generated, i.e. the powder application apparatus does not have to move over the carrier without generating a powder layer.

The first powder storage may extend along a plane being inclined with regard to a vertical plane coinciding with a longitudinal axis of the powder application apparatus such that a distance between the vertical plane and the first powder storage increases when moving from a first part of the first powder storage to a second part of the first powder storage. Further, the second powder storage may extend along a plane being inclined with regard to the vertical plane of the powder application apparatus such that a distance between the vertical plane and the second powder storage increases when moving from a first part of the second powder storage to a second part of the second powder storage.

In this way, the volume of the first powder storage and the volume of the second powder storage are kept small which means that the amount of raw powder material in the first powder storage/second powder storage is also limited. This reduces the weight of the power application apparatus. On the other hand, since there is enough raw material powder in the first powder storage and the second powder storage for generating two subsequent powder layers (one when moving the power application apparatus towards the second stopper using raw material powder from the second powder storage, and another one when moving the power application apparatus towards the first stopper using raw material powder from the first powder storage), no interruption of the powder application process is needed. It is sufficient to refill raw material powder into the first powder storage and into the second powder storage after two powder application cycles.

An inlet end of the first powder storage may comprise a plurality of first inlets for receiving raw material powder, and an inlet end of the second powder storage may comprise a plurality of second inlets for receiving raw material powder, wherein the first inlets are different from the second inlets. In this way, it is possible to precisely fill the same amount of raw material powder into the first powder storage and into the second powder storage by making sure that the amount of raw material powder received by the first inlets corresponds to that of the second inlets. This ensures that the thicknesses of the powder layers can be controlled to be exactly the same. On the other hand, this enables to fill a first powder material into the first powder storage, and to fill a second powder material into the second powder storage without having the danger that the different powder materials mix with each other. Thus, sandwich layer structures of different powder material layers can be generated easily. The first inlets and the second inlets may alternate with each other along a direction parallel to the longitudinal axis of the powder application apparatus.

At a bottom surface of the powder application apparatus, a detachably attached leveling slider may be provided. Thus, the leveling slider may be exchanged easily on demand, depending on the kind of manufacturing process. The leveling slider serves to evenly distribute powder applied onto the carrier from the first and/or the second powder storage over a surface of the carrier. Preferably, the leveling slider is arranged on the powder application apparatus in such a position that the leveling slider, in a moving direction of the powder application apparatus over the carrier, is disposed behind the powder supply channel through which raw material powder is supplied onto the carrier. In a powder application apparatus comprising two powder storages and two powder supply channels, the leveling slider preferably is arranged between the first and the second powder supply channel.

Between the first powder storage and the second powder storage, a space may be provided which extends, starting from a bottom surface of the powder application apparatus, into the powder application apparatus towards a first part of the powder application apparatus. A holding element may be fitted into the space such that it is movable along a vertical direction within the space, wherein a bottom surface of the holding element comprises the detachably attached leveling slider.

The vertical position of the holding element may be adjustable by micrometer screws extending vertically through a top surface of the powder application apparatus and through the space by actuating the micrometer screws at their top ends. In this way, a very simple mechanism is provided enabling to easily modify the vertical position of the detachably attached leveling slider.

According to an aspect of the present invention, in a method of manufacturing work pieces by exposing powder layers to electromagnetic radiation or particle radiation using a powder application apparatus as described above the first channel opening/closing element is moved between the first and the second position by means of an external mechanical force acting on the first channel opening/closing element, the external mechanical force being caused by abutting the first channel opening/closing element against a stopper of the device for manufacturing work pieces when moving the powder application apparatus over the carrier.

The method may involve the use of a powder application apparatus which further comprises a second powder storage provided in a first part of the powder application apparatus and configured to receive and store raw material powder, a second powder supply channel provided in a second part of the powder application apparatus and configured to discharge raw material powder from the second powder storage onto the carrier located below the apparatus, and a second channel opening/closing element provided in the second powder supply channel and configured to be moved between a first position in which the second powder supply channel allows the discharge of raw material powder from the second powder storage onto the carrier, and a second position in which the second powder supply channel prevents the discharge of raw material powder from the second powder storage onto the carrier. The method then may further comprise the step of moving the second channel opening/closing element between the first and the second position by means of an external mechanical force acting on the second channel opening/closing element, the external mechanical force being caused by abutting the second channel opening/closing element against a stopper of the device for manufacturing work pieces when moving the powder application apparatus over the carrier.

The method may further comprise the step of simultaneously positioning both, the first and the second channel opening/closing element in a filling position, in which they prevent the discharge of raw material powder from the first and the second powder storage onto the carrier. Further, both, the first and the second channel opening/closing element, may be moved from their filling position in a first moving direction so as to cause the first channel opening/closing element to move into its first position, in which it allows the discharge of raw material powder from the first powder storage onto the carrier, and to simultaneously cause the second channel opening/closing element to move into its second position, in which it prevents the discharge of raw material powder from the second powder storage onto the carrier. Finally, it is also conceivable to move both, the first and the second channel opening/closing element from the filling position in a second moving direction so as to cause the first channel opening/closing element to move into its second position, in which it prevents the discharge of raw material powder from the first powder storage onto the carrier, and to simultaneously cause the second channel opening/closing element to move into its first position, in which it allows the discharge of raw material powder from the second powder storage onto the carrier.

BRIEF DESCRIPTION OF THE DRAWINGS

In the following description, exemplary embodiments of the present invention will be explained, wherein.

DETAILED DESCRIPTION

In the embodiments explained in the following, identical/similar areas, parts or elements are denoted by identical reference numerals.

Figure 2A:
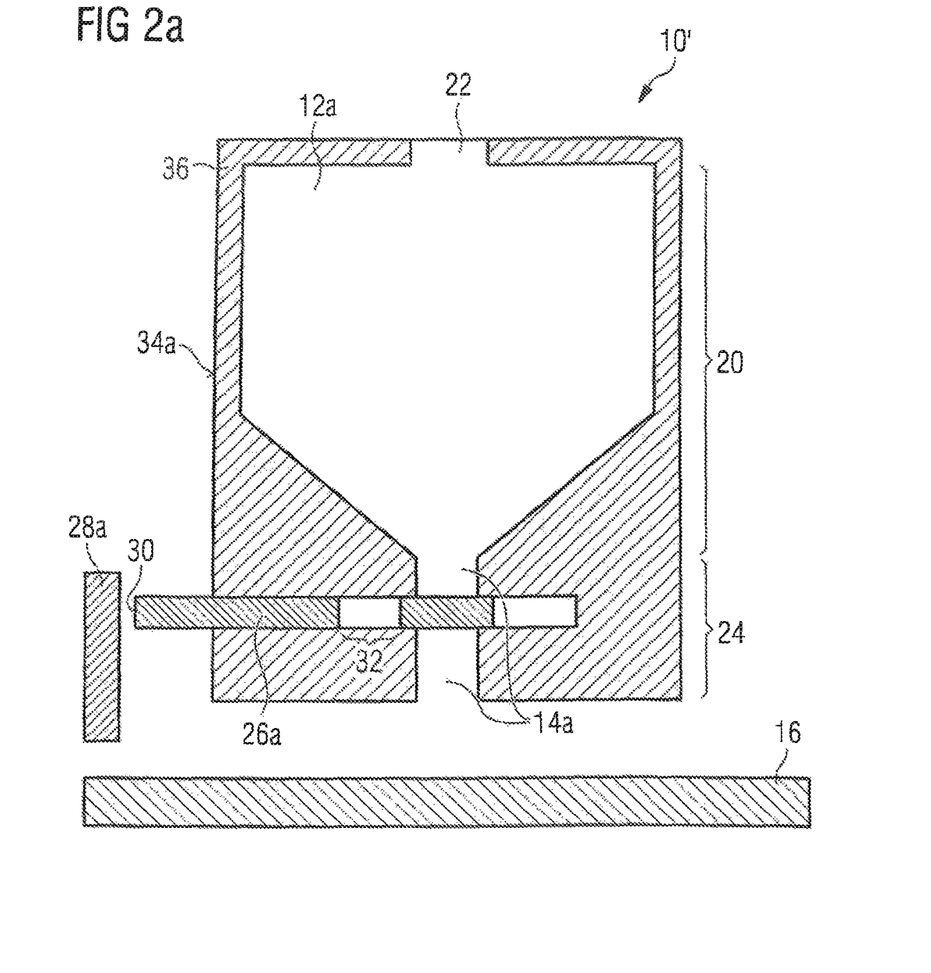
FIGS. 2a, 2b show a schematic cross-sectional illustration of a powder application apparatus according to an embodiment of the present invention.
Figure 2B:
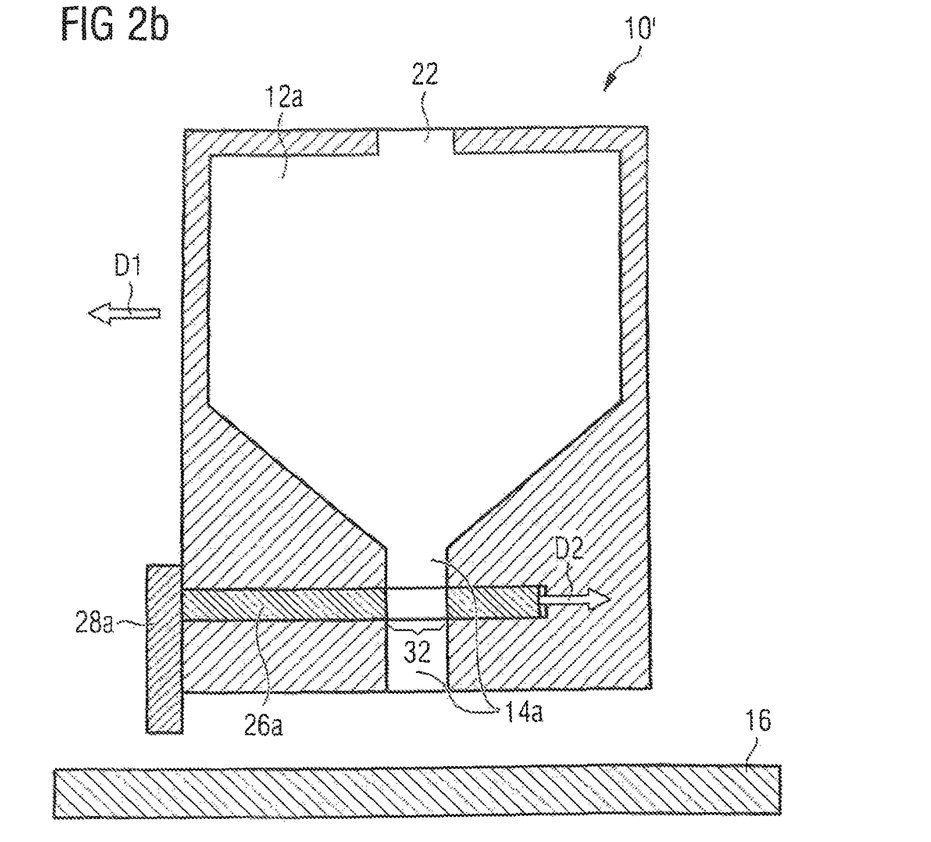

As shown in FIGS. 2a and 2b, a powder application apparatus 10' according to a first embodiment of the present invention is provided for use in a device for manufacturing work pieces by exposing powder layers to electromagnetic radiation or particle radiation. The powder application apparatus 10' comprises a first powder storage 12a provided in a first, i.e. an upper part 20 of the powder application apparatus 10' and configured to receive and store raw material powder via a powder inlet 22. The powder application apparatus 10' further comprises a first powder supply channel 14a provided in a second, i.e. a lower part 24 of the powder application apparatus 10' and configured to discharge raw material powder from the first powder storage 12a onto a carrier 16 located below the apparatus.

Further, the powder application apparatus 10' comprises a first channel opening/closing element 26a which is provided in the first powder supply channel 14a, the first channel opening/closing element 26a being configured to be moved between a first position (see FIG. 2b) in which the first channel opening/closing element 26a allows the discharge of raw material powder from the first powder storage 12a onto the carrier 16, and a second position (see FIG. 2a) in which the first channel opening/closing element 26a prevents the discharge of raw material powder from the first powder storage 12a onto the carrier 16. The first channel opening/closing element 26a is configured to be moved between the first and the second position by means of an external mechanical force acting on the first channel opening/closing element 26a, the external mechanical force being caused by abutting the first channel opening/closing element 26a against a first stopper 28a of the device for manufacturing work pieces when moving the powder application apparatus 10' over the carrier 16. The first stopper 28a is formed separate from the carrier 16. For example, the first stopper 28a may be mounted to a sidewall of a housing of the device for manufacturing work pieces (not shown in the drawings).

That is, in the second position (which is the default position), the first channel opening/closing element 26a projects from a side surface 34a of a housing 36 of the powder application apparatus 10' and a first end 30 of the first channel opening/closing element 26a does not abut against the first stopper 28a. However, when moving the powder application apparatus 10' along a first direction D1 over the carrier 16, the first end 30 of the first channel opening/closing element 26a abuts against the first stopper 28a. In this way, an external mechanical force is generated which acts on the first end 30 and causes the first channel opening/closing element 26a to move within the powder application apparatus 10' along a second direction D2 opposite to the first direction D1. In this way, the first channel opening/closing element 26a is moved from its second position into its first position. When the first channel opening/closing element 26a is disposed in the first position, the first channel opening/closing element 26a no longer projects from the side surface 34a of the housing 36 of the powder application apparatus 10'. Instead, the first end 30 is aligned with the side surface 34a of the housing 36 and. An opening area 32 of the first channel opening/closing element 26a is located within the first powder supply channel 14a, thereby forming a passage between the first powder storage 12a and the second part of the first powder supply channel 14a, whereas, in the second position of the first channel opening/closing element 26a, the opening area 32 is located outside the first powder supply channel 14a.

The powder application apparatus 10' further comprises a spring element (not shown) which is connected to the first channel opening/closing element 26a and the powder application apparatus 10' such that the spring element causes a force which automatically pushes the first channel opening/closing element 26a from the first position into the second position as soon as the first channel opening/closing element 26a no longer abuts against the stopper. The stopper 28a thus merely serves to push the first channel opening/closing element 26a into its first position, whereas the spring serves to move the first channel opening/closing element 26a into its second position.

The powder application apparatus 10' has a simple structure since the first channel opening/closing element 26a is wholly mechanically driven, i.e. no electric motors are needed as driving means. Thus, the weight of the powder application apparatus 10' is low. This makes it possible to increase the speed/acceleration of movement of the powder application apparatus 10' over the carrier. The amount of powder applied onto the carrier 16 is controlled by suitably controlling the amount of powder introduced into the first powder storage 12a. In particular, the first powder storage 12a is filled with an amount of powder that corresponds to the amount of powder which is necessary to apply the next powder layer onto the carrier 16 plus a predetermined excess powder amount which serves to prevent underfeeding of powder onto the carrier 16.

Figure 3A:
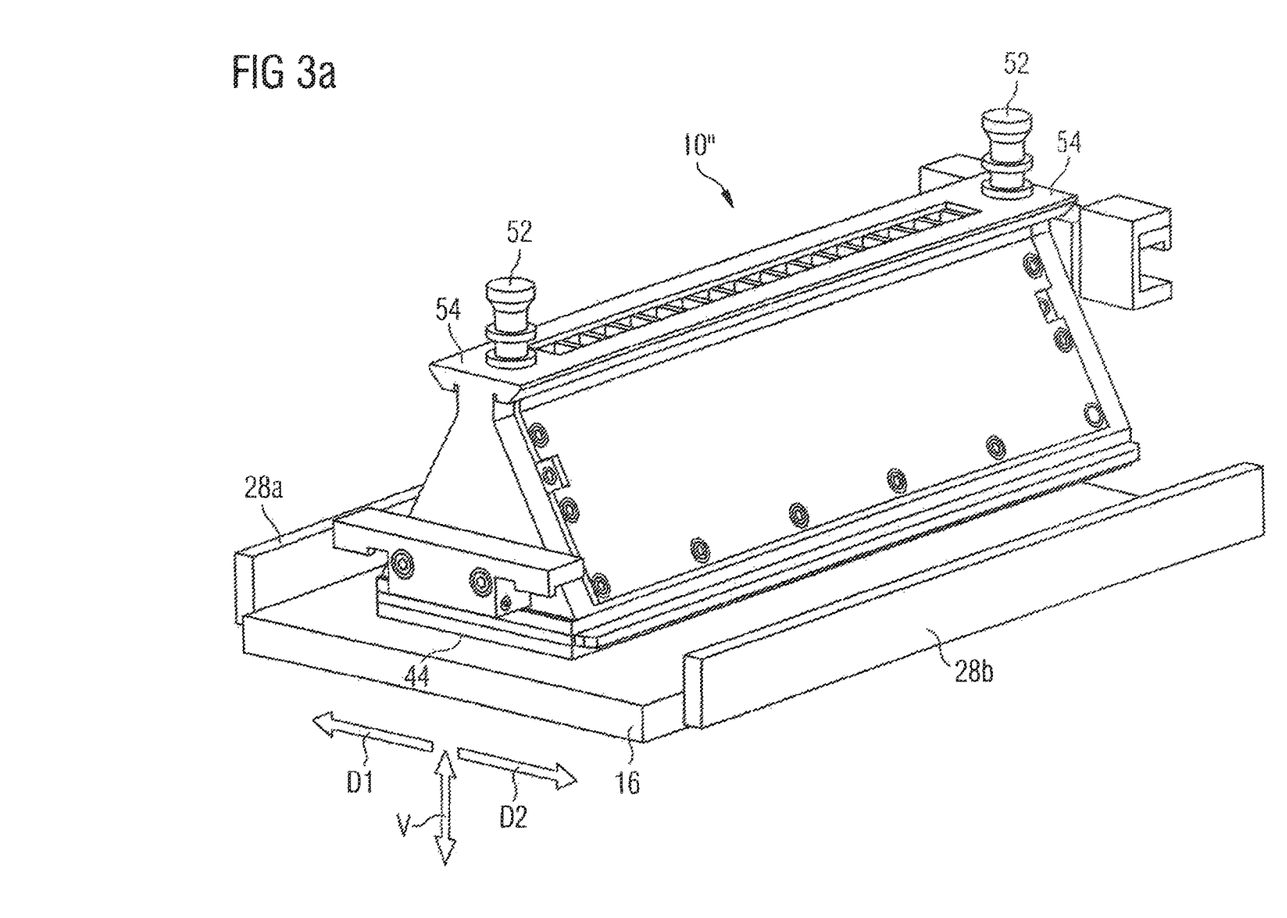
FIGS. 3a-3c show a perspective-cross-sectional illustration of a powder application apparatus according to an embodiment of the present invention.
Figure 3B:
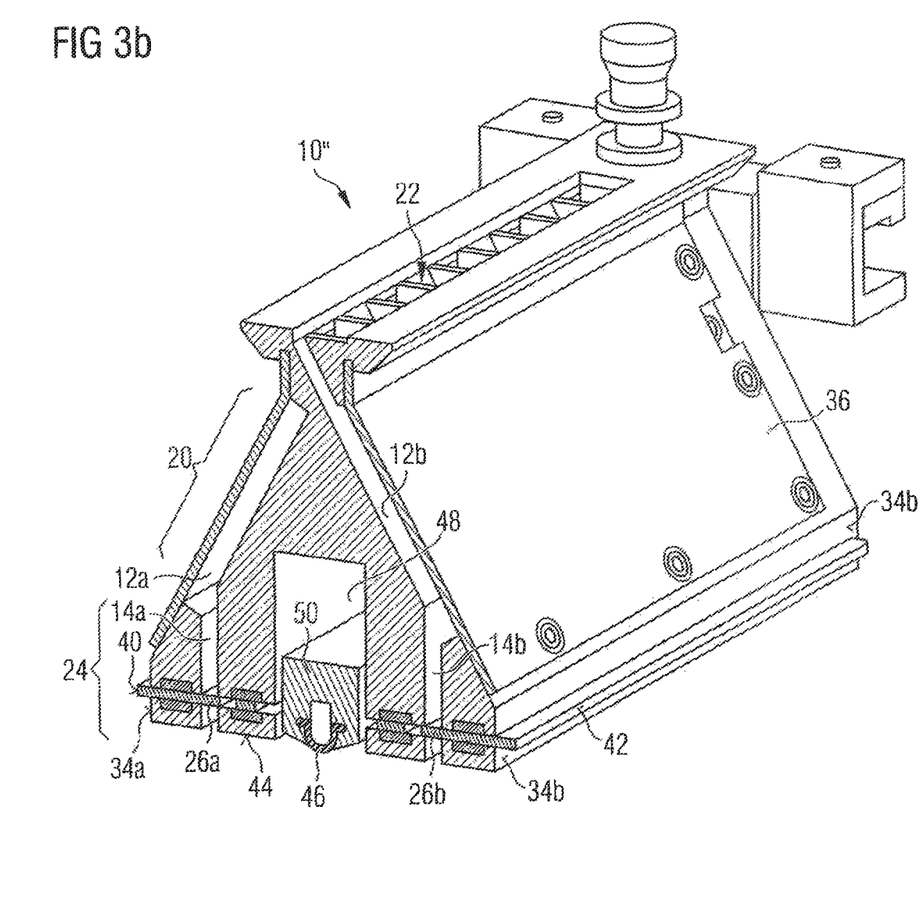
Figure 3C:
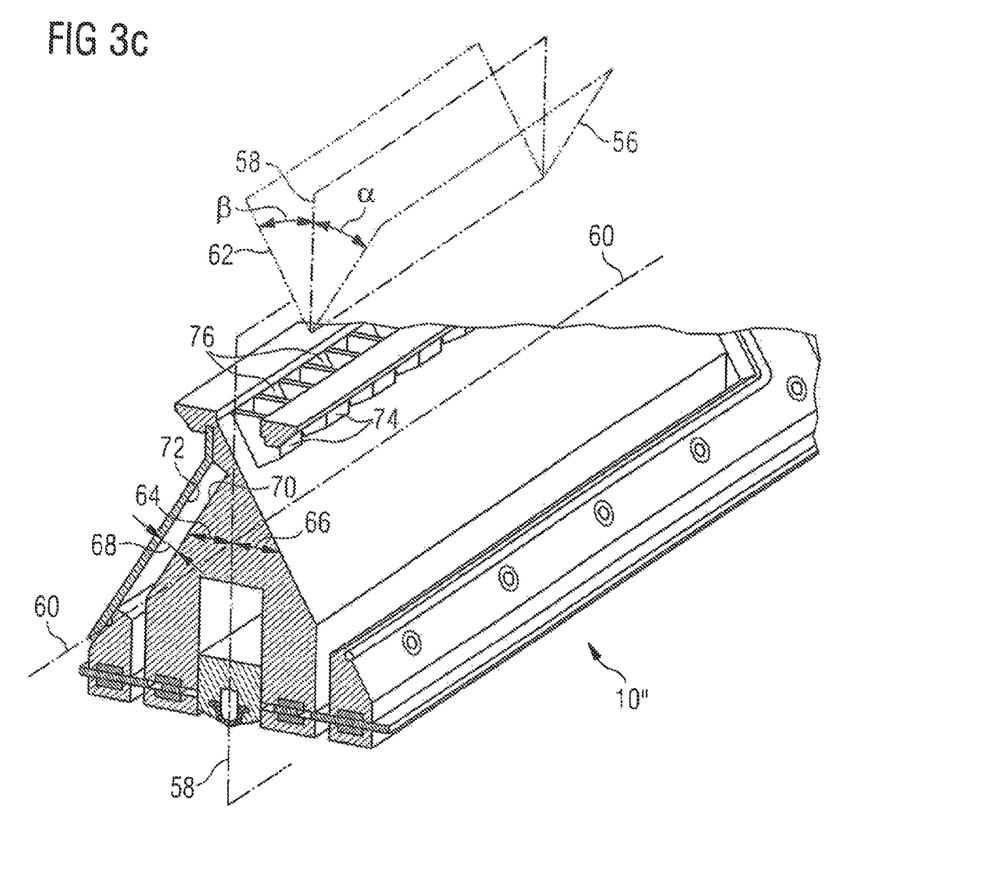

FIGS. 3a to 3c show a second embodiment of a powder application apparatus 10". The powder application apparatus 10" comprises a first powder storage 12a provided in a first, i.e. an upper part 20 of the powder application apparatus 10" and configured to receive and store raw material powder via a powder inlet 22. The powder application apparatus 10" further comprises a first powder supply channel 14a provided in a second, i.e. a lower part 24 of the powder application apparatus 10" and configured to discharge raw material powder from the first powder storage 12a onto a carrier 16 located below the powder application apparatus 10".

Further, a first channel opening/closing element 26a is provided in the first powder supply channel 14a, the first channel opening/closing element 26a being configured to be moved between a first position in which the first channel opening/closing element 26a allows the discharge of raw material powder from the first powder storage 12a onto the carrier 16, and a second position in which the first channel opening/closing element 26a prevents the discharge of raw material powder from the first powder storage 12a onto the carrier 16.

The powder application apparatus 10" further comprises a second powder storage 12b provided in the first part 20 of the powder application apparatus 10" and being configured to receive and store raw material powder via the powder inlet 22. A second powder supply channel 14b is provided in the second part 24 of the powder application apparatus 10" and configured to discharge raw material powder from the second powder storage 12b onto the carrier 16.

A second channel opening/closing element 26b is provided in the second powder supply channel 14b, the second channel opening/closing element 26b being configured to be moved between a first position in which the second channel opening/closing element 26b allows the discharge of raw material powder from the second powder storage 12b onto the carrier 16, and a second position in which the second channel opening/closing element 26b prevents the discharge of raw material powder from the second powder storage 12b onto the carrier 16.

The first and the second channel opening/closing element 26a, 26b are formed integrally with each other. Further, the first and the second channel opening/closing element 26a, 26b are configured such that both, the first and the second channel opening/closing element 26a, 26b, can be simultaneously positioned in a filling position, in which they prevent the discharge of raw material powder from the first and the second powder storage 12b onto the carrier 16 (see FIGS. 3b and 3c). When the first and the second channel opening/closing element 26a, 26b are disposed in their filling position, the first and the second powder storage 14a, 14b can be filled with a desired amount of powder, while the discharge of said powder onto the carrier 16 is prevented. When disposed in its filling position, the first channel opening/closing element 26 projects from a first side surface 34a of a housing 36 of the powder application apparatus 10".

Similarly, when disposed in its filling position, the second channel opening/closing element 26b projects from a second side surface 34b of the housing 36 of the powder application apparatus 10", the second side surface 34b being disposed opposite from the first side surface 34a.

The first channel opening/closing element 26a is configured to be moved between its first and its second position by means of an external mechanical force acting on the first channel opening/closing element 26a, the external mechanical force being caused by abutting the first channel opening/closing element 26a against a first stopper 28a of the device for manufacturing work pieces when moving the powder application apparatus 10" over the carrier 16 in a first moving direction D1 and by abutting the first channel opening/closing element 26a, via the second channel opening/closing element 26b, against a second stopper 28b of the device for manufacturing work pieces when moving the powder application apparatus 10" over the carrier 16 in a second moving direction D2.

Similarly, the second channel opening/closing element 26b is configured to be moved between its first and its second position by means of an external mechanical force acting on the second channel opening/closing element 26b, the external mechanical force being caused by abutting the second channel opening/closing element 26b against the second stopper 28b of the device for manufacturing work pieces when moving the powder application apparatus 10" over the carrier 16 in the second moving direction D2 and by abutting the second channel opening/closing element 26b, via the first channel opening/closing element 26a, against the first stopper 28a of the device for manufacturing work pieces when moving the powder application apparatus 10" over the carrier 16 in the first moving direction D1. The first and the second stopper 28a, 28b are formed separate from the carrier 16. For example, the first and the second stopper 28a, 28b may be mounted to opposing sidewalls of a housing of the device for manufacturing work pieces (not shown in the drawings).

A combined movement of the first and the second channel opening/closing element 26a, 26b from their filling position in the first moving direction D1 due to a movement of the powder application apparatus 10" over the carrier 16 in the second moving direction D2 and the abutment of the second channel opening/closing element 26b against the second stopper 28b causes the first channel opening/closing element 26a to move into its first position, in which it allows the discharge of raw material powder from the first powder storage 12a onto the carrier 16. Simultaneously, the second channel opening/closing element 26b is moved into its second position, in which it still prevents the discharge of raw material powder from the second powder storage 12b onto the carrier 16.

When the first channel opening/closing element 26a is disposed in its first position, the first channel opening/closing element 26a projects further from the first side surface 34a of the housing 36 of the powder application apparatus 10" than in its filling position. The second channel opening/closing element 26b, when being disposed in its second position, however, projects less from the second side surface 34b of the housing 36 of the powder application apparatus 10" than in its filling position and in particular is aligned with the second side surface 34b of the housing 36 of the powder application apparatus 10".

Further, a combined movement of the first and the second channel opening/closing element 26a, 26b from their filling position in the second moving direction D2 due to a movement of the powder application apparatus 10" over the carrier 16 in the first moving direction D1 and the abutment of the first channel opening/closing element 26a against the first stopper 28a causes the first channel opening/closing element 26a to move into its second position, in which it still prevents the discharge of raw material powder from the first powder storage 12a onto the carrier 16. Simultaneously, the second channel opening/closing element 26 is moved into its first position, in which it allows the discharge of raw material powder from the second powder storage 12b onto the carrier 16.

When the first channel opening/closing element 26a is disposed in its second position, the first channel opening/closing element 26a projects less from the first side surface 34a of the housing 36 of the powder application apparatus 10" than in its filling position and in particular is aligned with the first side surface 34a of the housing 36 of the powder application apparatus 10". The second channel opening/closing element 26b, when being disposed in its first position, however, projects further from the second side surface 34b of the housing 36 of the powder application apparatus 10" than in its filling position.

In the embodiment of a powder application apparatus 10' shown in FIGS. 3a to 3c, a spring mechanism for pushing the first biasing at least one of the first and the second channel opening/closing element 26a, 26b in either the first or the second moving direction D1, D2 can be dispensed with. Instead, the movement of both, the first and the second channel opening/closing element 26a, 26b is achieved by the interaction of the first channel opening/closing element 26a with the first stopper 28a and the interaction of the second channel opening/closing element 26b with the second stopper 28b.

As becomes apparent from FIGS. 3b and 3c, at a bottom surface 44 of the powder application apparatus 10", a detachably attached leveling slider 46 is provided. The leveling slider 46 may be exchanged easily on demand. Between the first powder storage 12a and the second powder storage 12b, a space 48 is provided which extends, starting from the bottom surface 44 of the powder application apparatus 10", into the powder application apparatus 10" towards a first part 20 of the powder application apparatus 10". A holding element 50 is fitted into the space 48 such that it is movable along a vertical axis V within the space 48, wherein a bottom surface of the holding element 50 houses the detachably attached leveling slider 46. The vertical position of the holding element 50 is adjustable by micrometer screws 52 extending vertically through a top surface 54 of the powder application apparatus 10" and through the space 48, wherein the micrometer screws 52 can be actuated at their top ends. In this way, a very simple mechanism is provided enabling to easily modify the vertical position of the detachably attached leveling slider 46. In case the leveling slider 46 is made of a soft, elastic material such as, for example, rubber, the leveling slider 46 is received in a suitable recess provided in the holding element 50. In case the leveling slider 46 is made of a hard non-elastic material such as, for example, metal or ceramic, the leveling slider 46 is clamped to the holding element 50 by means of a suitable clamping mechanism.

The leveling slider 46 is arranged between the first and the second powder supply channel 14a, 14b. Hence, when the powder application apparatus 10" is moved over the carrier 16 in the first moving direction D1, the leveling slider 46 is disposed behind the first powder supply channel 14a and thus may distribute raw powder over the carrier 16 which has been discharged from the first powder storage 12a via the first powder supply channel 14a. Similarly, when the powder application apparatus 10" is moved over the carrier 16 in the second moving direction D2, the leveling slider 46 is disposed behind the second powder supply channel 14b and thus may distribute raw powder over the carrier 16 which has been discharged from the second powder storage 12a via the second powder supply channel 14b.

The first powder storage 12a extends parallel to a plane 56 being inclined by a first angle a with regard to a vertical plane 58 coinciding with a longitudinal axis 60 of the powder application apparatus 10" such that a distance 64 between the vertical plane 58 and the first powder storage 12a increases when moving from the first, i.e. an upper part of the first powder storage 12a towards a second part of the first powder storage 12a. Further, the second powder storage 12b extends along a plane 62 being inclined by a second angle β with regard to the vertical plane 58 of the powder application apparatus 10" such that a distance 66 between the vertical plane 58 and the second powder storage 12b increases when moving from a first, i.e. an upper part of the second powder storage 12b to a second part of the second powder storage 12b. Since the height 68 of the first powder storage 12a and the second powder storage 12b (i.e. a distance between a bottom surface 70 and a top surface 72 of the first/second powder storage 12a, 12b) is kept small, the volume of the first/second powder storage 12a, 12b is also limited which means that the amount of raw powder material stored in the first powder storage 12a/in the second powder storage 12b is also limited.

This reduces the weight of the power application apparatus 10" during movement of the power application apparatus over the carrier 16 which means that the moving speed can be increased. On the other hand, since there is enough raw material powder in the first powder storage 12a and the second powder storage 12b for generating two powder layers (one when moving the power application apparatus towards the first stopper 28a using raw material powder from the first powder storage 12a, and another one when moving the power application apparatus 10" towards the second stopper 28b using raw material powder from the second powder storage 12b), no interruption of the powder application process is needed. It is then sufficient to refill raw material powder into the first powder storage 12a and into the second powder storage 12b only after two powder layers have been generated.

Like in the first embodiment of a powder application apparatus 10' depicted in FIGS. 2a and 2b, also in the powder application apparatus 10" of FIGS. 3a to 3c the amount of powder applied onto the carrier 16 is controlled by suitably controlling the amount of powder introduced into the first and the second powder storage 12a, 12b. In particular, the first and the second powder storage 12a, 12b both are filled with an amount of powder that corresponds to the amount of powder which is necessary to apply one powder layer onto the carrier 16 plus a predetermined excess powder amount which serves to prevent underfeeding of powder onto the carrier 16.

An inlet end of the first powder storage 12a comprises a plurality of first inlets 74 for receiving raw material powder, and an inlet end of the second powder storage 12b comprises a plurality of second inlets 76 for receiving raw material powder, wherein the first inlets 74 alternate with the second inlets 76 other along a direction parallel to the longitudinal axis 60 of the powder application apparatus 10". In this way, it is possible to fill a first powder material into the first powder storage 12a, and to separately fill a second powder material into the second powder storage 12b without having the danger that the different powder materials mix with each other. Thus, sandwich layer structures of different materials can be generated easily. Since the bottom surfaces 70 of the first powder storage 12a and the second powder storage 12b are inclined, raw powder material received by the powder storages 12a, 12b slides down along the bottom surfaces 70 in a turbulent-free manner which improves the quality of the powder layers produced (no or only low generation of powder dust).

If the first inlets 74 or the second inlets 76 are blocked (e.g. by a corresponding plate), only one of the first storage 12a and the second powder storage 12b is filled with raw material powder. In this way, it is easy to switch between generation of only one powder layer per cycle or two powder layers per cycle.

What is claimed:

1. A method of manufacturing work pieces by exposing powder layers to electromagnetic radiation or particle radiation using a powder application apparatus comprising:
   a first powder storage provided in a first part of the powder application apparatus to receive and store raw material powder,
   a first powder supply channel provided in a second part of the powder application apparatus to discharge raw material powder from the first powder storage onto a carrier located below the apparatus, and
   a first channel opening/closing element provided in the first powder supply channel to move between a first position in which the first channel opening/closing element allows the discharge of raw material powder from the first powder storage onto the carrier, and a second position in which the first channel opening/closing element prevents the discharge of raw material powder from the first powder storage onto the carrier, the method comprises:
   moving the first channel opening/closing element between the first and the second position by means of an external mechanical force acting on the first channel opening/closing element, the external mechanical force being caused by abutting the first channel opening/closing element against a stopper of the device for manufacturing work pieces when moving the powder application apparatus over the carrier.

2. The method of claim 1, wherein in one of the first and the second position, the first channel opening/closing element projects from a side surface of a housing of the powder application apparatus, and wherein in the other one of the first and the second position, the first channel opening/closing element does not project from the side surface of the housing of the powder application apparatus, or projects less or further from the side surface of the housing of the powder application apparatus.

3. The method of claim 2, wherein the first channel opening/closing element is a plate member movable in a horizontal direction between the first and the second position, wherein in one of the first and the second position, a side surface of the plate member projects from the side surface of the housing of the powder application apparatus, and wherein in the other one of the first and the second position, the side surface of the plate member is aligned with the side surface of the housing of the powder application apparatus or projects less or further from the side surface of the housing of the powder application apparatus.

4. The method of claim 1, wherein the powder application apparatus further comprising:
   a second powder storage provided in a first part of the powder application apparatus to receive and store raw material powder,
   a second powder supply channel provided in a second part of the powder application apparatus to discharge raw material powder from the second powder storage onto the carrier located below the apparatus, and
   a second channel opening/closing element provided in the second powder supply channel to move between a first position in which the second channel opening/closing element allows the discharge of raw material powder from the second powder storage onto the carrier, and a second position in which the second channel opening/closing element prevents the discharge of raw material powder from the second powder storage onto the carrier, wherein the method further comprises:
   moving the second channel opening/closing element between the first and the second position by means of an external mechanical force acting on the second channel opening/closing element, the external mechanical force being caused by abutting the second channel opening/closing element against a stopper, the first channel opening/closing element allows the discharge of the device for manufacturing work pieces when moving the powder application apparatus over the carrier.

5. The method of claim 4, wherein the first channel opening/closing element and the second channel opening/closing element are formed integrally with each other.

6. The method of claim 1, further comprising at least one of:
   simultaneously positioning both the first and the second channel opening/closing element in a filling position to prevent the discharge of raw material powder from the first and the second powder storage onto the carrier,
   moving both the first and the second channel opening/closing elements from their filling position in a first moving direction so as to cause the first channel opening/closing element to move into its first position to allow the discharge of raw material powder from the first powder storage onto the carrier, and to simultaneously cause the second channel opening/closing element to move into its second position to prevent the discharge of raw material powder from the second powder storage onto the carrier, and
   moving both the first and the second channel opening/closing elements from the filling position in a second moving direction to cause the first channel opening/closing element to move into its second position to prevent the discharge of raw material powder from the first powder storage onto the carrier, and to simultaneously cause the second channel opening/closing element to move into its first position to allow the discharge of raw material powder from the second powder storage onto the carrier.

7. The method of claim 4,
   wherein the first powder storage extends along a plane being inclined with regard to a vertical plane coinciding with a longitudinal axis of the powder application apparatus such that a distance between the vertical plane and the first powder storage increases when moving from an inlet part of the first powder storage to an outlet part of the first powder storage, and/or
   wherein the second powder storage extends along a plane being inclined with regard to the vertical plane of the powder application apparatus such that a distance between the vertical plane and the second powder storage increases when moving from an inlet part of the second powder storage to an outlet part of the second powder storage, and/or wherein an inlet end of the first powder storage comprises a plurality of first inlets for receiving raw material powder, and wherein an inlet end of the second powder storage comprises a plurality of second inlets for receiving raw material powder, wherein the first inlets are different from the second inlets, and wherein the first inlets and the second inlets in particular alternate with each other along a direction parallel to the longitudinal axis of the powder application apparatus, and/or wherein, at a bottom surface of the powder application apparatus, a detachably attached leveling slider is provided.

8. The method of claim 4, wherein a space is provided between the first powder storage and the second powder storage, the space extending from a bottom surface of the powder application apparatus into the powder application apparatus towards the first part of the powder application apparatus, wherein a holding element is fitted into the space such that it is movable along a vertical direction within the space, and wherein a bottom surface of the holding element comprises a detachably attached leveling slider.

9. The method of claim 8, wherein the vertical position of the holding element is adjustable by micrometer screws extending vertically through a top surface of the powder application apparatus and through the space so that the micrometer screws can be actuated at their top ends.

10. A method of manufacturing work pieces by exposing powder layers to electromagnetic radiation or particle radiation, the method comprising:
  providing a housing;
  providing a carrier below the housing; and
  providing a first stopper mounted to a sidewall of the housing;
  providing a powder application apparatus comprising:
    a first powder storage provided in a first part of the powder application apparatus to receive and store raw material powder,
    a first powder supply channel provided in a second part of the powder application apparatus to discharge raw material powder from the first powder storage onto the carrier located below the powder application apparatus, and
    a first channel opening/closing element having a first end and an opening, and slidably disposed in the second part of the powder application apparatus to move between a first position where the opening aligns with the first powder supply channel to allow the discharge of raw material powder from the first powder storage onto the carrier, and a second position where the opening is not aligned with the first powder supply channel to prevent the discharge of raw material powder from the first powder storage onto the carrier;
  moving the powder application apparatus over the carrier towards the first stopper;
  abutting the first end of the first channel opening/closing element against the first stopper to move the first channel opening/closing element from the second position to the first position,
  wherein the first channel opening/closing element is moved between the first position and the second position by means of an external mechanical force acting on the first channel opening/closing element, the external mechanical force being caused by abutting the first channel opening/closing element against the first stopper when moving the powder application apparatus over the carrier.

11. The method of claim 10, wherein in one of the first and the second positions, the first channel opening/closing element projects from a side surface of the housing of the powder application apparatus, and wherein in the other one of the first and the second positions, the first channel opening/closing element is either aligned with the side surface, or projects from the side surface less than or greater than the first channel opening/closing element does in the respective other of the first and second positions.

12. The method of claim 11, wherein the first channel opening/closing element is a plate member movable in a horizontal direction between the first and the second position, wherein in one of the first and the second position, a side surface of the plate member projects from the side surface of the housing of the powder application apparatus, and wherein in the other one of the first and the second position, the side surface of the plate member is either aligned with the side surface of the housing of the powder application apparatus or projects less than or further from the side surface of the housing of the powder application apparatus than the first channel opening/closing element does in the respective other of the first and second position.

13. The method of claim 10, wherein the powder application apparatus further comprising:
  a second powder storage provided in a first part of the powder application apparatus to receive and store raw material powder;
  a second powder supply channel provided in a second part of the powder application apparatus to discharge raw material powder from the second powder storage onto the carrier located below the powder application apparatus; and
  a second channel opening/closing element having a first end and an opening, and slidably disposed in the second part of the powder application apparatus to move between a first position where the opening aligns with the second powder supply channel to allow the discharge of raw material powder from the second powder storage onto the carrier, and a second position where the opening is not aligned with the second powder supply channel to prevent the discharge of raw material powder from the second powder storage onto the carrier; and
  a second stopper mounted to a sidewall of the housing opposite that of the first stopper,
  wherein upon moving the powder application apparatus over the carrier towards the second stopper, the first end of the second channel opening/closing element abuts against the second stopper to move the second channel opening/closing element from the second position to the first position.

14. The method of claim 13, wherein the first channel opening/closing element and the second channel opening/closing element are formed integrally with each other.

15. The method of claim 10, further comprising at least one of:
  simultaneously positioning both the first and the second channel opening/closing elements in a filling position to prevent the discharge of raw material powder from the first and the second powder storage onto the carrier;
  moving both the first and the second channel opening/closing elements from their filling position in a first moving direction to cause the first channel opening/closing element to move into its first position to allow the discharge of raw material powder from the first powder storage onto the carrier, and to simultaneously cause the second channel opening/closing element to move into its second position to prevent the discharge of raw material powder from the second powder storage onto the carrier, and moving both the first and the second channel opening/closing elements from the filling position in a second moving direction to cause the first channel opening/closing element to move into its second position to prevent the discharge of raw material powder from the first powder storage onto the carrier, and to simultaneously cause the second channel opening/closing element to move into its first position to allow the discharge of raw material powder from the second powder storage onto the carrier.

16. The method of claim 13,
wherein the first powder storage extends along a plane being inclined with regard to a vertical plane coinciding with a longitudinal axis of the powder application apparatus such that a distance between the vertical plane and the first powder storage increases when moving from an inlet part of the first powder storage to an outlet part of the first powder storage, and/or
wherein the second powder storage extends along a plane being inclined with regard to the vertical plane of the powder application apparatus such that a distance between the vertical plane and the second powder storage increases when moving from an inlet part of the second powder storage to an outlet part of the second powder storage, and/or
wherein an inlet end of the first powder storage comprises a plurality of first inlets for receiving raw material powder, and wherein an inlet end of the second powder storage comprises a plurality of second inlets for receiving raw material powder, wherein the first inlets are different from the second inlets, and wherein the first inlets and the second inlets in particular alternate with each other along a direction parallel to the longitudinal axis of the powder application apparatus, and/or
wherein, at a bottom surface of the powder application apparatus, a detachably attached leveling slider is provided.

17. The method of claim 13, wherein a space is provided between the first powder storage and the second powder storage, the space extending from a bottom surface of the powder application apparatus into the powder application apparatus towards the first part of the powder application apparatus, wherein a holding element is fitted into the space such that it is movable along a vertical direction within the space, and wherein a bottom surface of the holding element comprises a detachably attached leveling slider.

18. The method of claim 17, wherein the vertical position of the holding element is adjustable by micrometer screws extending vertically through a top surface of the powder application apparatus and through the space so that the micrometer screws can be actuated at their top ends.

* * * * *